United States Patent
Strickland et al.

(10) Patent No.: US 7,064,711 B2
(45) Date of Patent: Jun. 20, 2006

(54) METHOD FOR ITERATIVE DETERMINATION OF DISTANCE BETWEEN RECEIVING STATION AND TRANSMITTING STATION AND ALSO CALCULATING UNIT AND COMPUTER SOFTWARE PRODUCT

(75) Inventors: Stuart Strickland, Bellevue, WA (US); Markus Warken, Laupheim (DE)

(73) Assignee: Siemens Aktiengesellschaft, Munich (DE)

( * ) Notice: Subject to any disclaimer, the term of this patent is extended or adjusted under 35 U.S.C. 154(b) by 205 days.

(21) Appl. No.: 10/820,143

(22) Filed: Apr. 8, 2004

(65) Prior Publication Data

US 2004/0212530 A1    Oct. 28, 2004

(30) Foreign Application Priority Data

Apr. 9, 2003   (DE) ................................ 103 16 290

(51) Int. Cl.
   *G01S 3/02*     (2006.01)
(52) U.S. Cl. ....................................................... 342/458
(58) Field of Classification Search ................ 342/109, 342/133, 458, 463
   See application file for complete search history.

(56) References Cited

U.S. PATENT DOCUMENTS

| 4,976,619 | A  | * | 12/1990 | Carlson ........................ 434/16 |
| 5,056,106 | A  | * | 10/1991 | Wang et al. ................. 375/130 |
| 6,026,240 | A  | * | 2/2000 | Subramanian ............... 717/161 |
| 6,191,729 | B1 | * | 2/2001 | Arethens ............... 342/357.02 |

OTHER PUBLICATIONS

3GPP TS 25.305, 3rd Generation Partnership Project: Technical Specification Group Radio Access Network; Stage 2 Functional specification of User Equipment (UE) Positioning in UTRAN, pp. 1-54.

* cited by examiner

*Primary Examiner*—Dao Phan
(74) *Attorney, Agent, or Firm*—Staas & Halsey LLP

(57) ABSTRACT

Information received by a calculating unit via a signal from a transmitting station to a receiving station is provided with a code, a number of integral multiples of the code coming into the receiving station during the signal transfer time that the signal requires to travel between the transmitting station and the receiving station. During a first iteration, the number of integral multiples of the code is calculated and the calculated number is used at least in a second iteration without a fresh calculation being carried out.

17 Claims, 1 Drawing Sheet

METHOD FOR ITERATIVE DETERMINATION OF DISTANCE BETWEEN RECEIVING STATION AND TRANSMITTING STATION AND ALSO CALCULATING UNIT AND COMPUTER SOFTWARE PRODUCT

CROSS REFERENCE TO RELATED APPLICATIONS

This application is based on and hereby claims priority to German Application No. 103 16 290.9 filed on 9 Apr. 2003, the contents of which are hereby incorporated by reference.

BACKGROUND OF THE INVENTION

1. Field of the Invention

The invention discloses a method for the iterative determination of the distance between a receiving station and a transmitting station and also a corresponding calculating unit, a corresponding computer software product and a corresponding data carrier.

2. Description of the Related Art

The GPS method (GPS: Global Positioning System) for determining the position of a station is based on the principle of measuring signal transfer times between satellites having known positions and a GPS receiver that is installed in a station. The transfer time for a signal is proportional to the distance of the respective satellite from the station, that is, the distance between a satellite and the station can be converted, using the propagation velocity of the corresponding signal, into the respective signal transfer time. Since both the position of the station and the extent by which the clock at the station deviates from the atomic clocks on the synchronized satellites are unknown, the position of the station is determined using the distances from at least four satellites.

The signals which the satellites transmit are satellite-specific code sequences which are modulated to a carrier frequency. The basic measurement of the station to determine its position consists in measuring for each satellite a phase offset between the respective code received and a copy of the code, which is produced in the receiver. The respective phase offset (chip code offset) is a measure of the signal transfer time and therefore of the distance between the station and the corresponding satellite. A code available for civil use currently consists of 1023 chips and is repeated with a cycle of one millisecond. In the one-millisecond duration of a code cycle, a satellite signal which is propagated in a vacuum at the speed of light travels about 300 km. The distance between the satellite and the ground station is typically several thousand kilometers, however. During the time which the signal requires to cover the distance between the satellite and the station, however, the code is therefore repeated several times. In other words, this means that, during the signal transfer time, the satellite uses the code N times to modulate the continuously transmitted signal and that the station receives the code N times in the same period of time.

A precise determination of the phase offset is an essential component of a determination of the distance that the station is from the respective satellite and therefore forms the basis of the determination of the station's position. Since the phase offset is, however, measured using only one code cycle, the total transfer time that the signal requires to cover the distance between the satellite and the station cannot be determined from the phase offset alone. The signal transfer time is made up of a whole number of repeats of the code and of a modulo ensuing from the determination of the phase offset. The phase offset is calculated directly by the station, whereas the integral multiples of the code are calculated by an iterative method in the course of the determination of the station's position. The computing power that such an iterative method needs is directly dependent on the number of iterative steps required to determine the integral multiples in a satellite's code.

SUMMARY OF THE INVENTION

The invention therefore addresses the problem of providing an improved method of determining the distance between a satellite and a station.

In the method according to the invention for the iterative determination of the distance between a receiving station and a transmitting station, information is received by a calculating unit concerning a signal from the transmitting station that is received by the receiving station, the signal being provided with a code. A number of integral multiples of the code come into the receiving station during the signal transfer time that the signal requires to travel between the transmitting station and the receiving station. During the first iteration the number of integral multiples in the code is calculated and the calculated number is used in the second iteration at least, without a fresh calculation being carried out. As a result of the fact that in the second iteration at least, a fresh calculation of the number of integral multiples is not made, the computing power required can be reduced.

It is therefore particularly advantageous if the calculated number of integral multiples is used in all the iterations.

It is advantageous that a rough estimation of the position of the receiving station is used to calculate the number of integral multiples of the code. The rough estimation of the position of the receiving station, together with an estimation of the position of the transmitting station, allows a sufficiently precise estimation of the distance between the receiving station and the transmitting station to be made. From the distance calculated in the above way it is possible to calculate the exact number of integral multiples if the position of the transmitting station is known almost exactly (in satellites, for example, from their known stable orbits) and if the position of the receiving station is known with an accuracy greater than the half-wavelength of the code. Here, the wavelength of the code is obtained by multiplying the duration of the code by the propagation velocity of the signal, that is, in vacuum, by the speed of light. The exact number of integral multiples is consequently determined in the very first iteration of the method and is no longer necessary in all subsequent iterations. When multiplied by the wavelength of the code, the number of integral multiples corresponds to a minimum distance between the transmitting station and receiving station. The above minimum distance is one of the addends used to calculate the actual distance in the first and at least, in the second iteration.

It is practical if the receiving station is located in a radio cell of a radio communication system and if the rough estimation of the position of the receiving station is based on a radio cell identifier assigned to the receiving station. As a result of such an estimation of the position, the position of the receiving station is known with an accuracy greater than the half-wavelength of the code. The exact number of integral multiples can be calculated in the very first iteration therefore, as described in the previous paragraph.

The number of iterations required to determine the distance between the receiving station and the transmitting station can be reduced, that is, the computing power required can be reduced, if a value other than zero is used in the very first iteration for the signal's signal transfer time.

BRIEF DESCRIPTION OF THE DRAWINGS

These and other objects and advantages of the present invention will become more apparent and more readily appreciated from the following description of the exemplary embodiments, taken in conjunction with the accompanying drawings of which.

DETAILED DESCRIPTION OF THE PREFERRED EMBODIMENT

Figure 1:
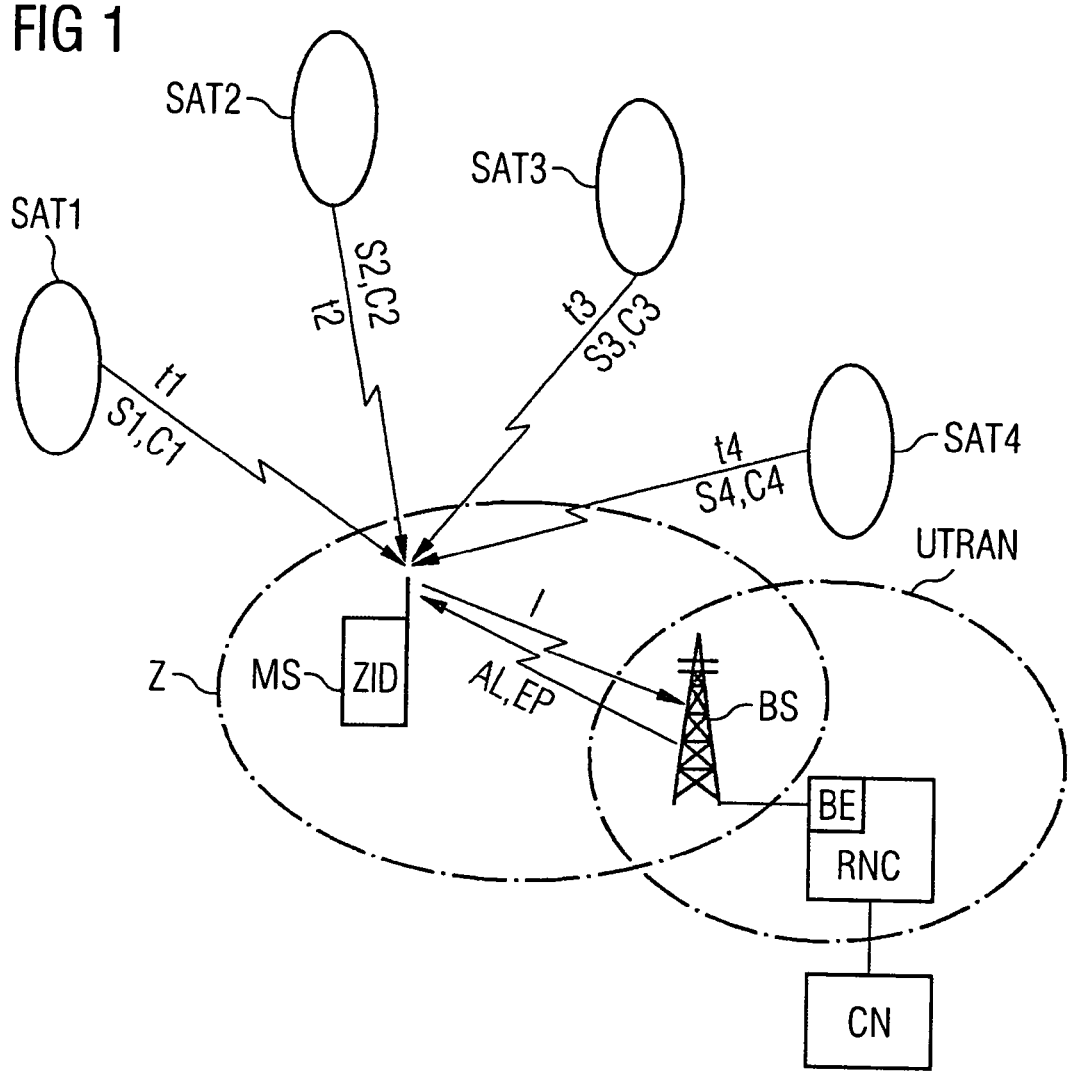
FIG. 1 is a block diagram of an exemplary embodiment of a radio system according to the invention which shows the transmission of signals by four satellites to a mobile station and FIG. 2 is an illustrative diagram of a signal transmission between a satellite and the mobile station shown in FIG. 1.

Reference will now be made in detail to the preferred embodiments of the present invention, examples of which are illustrated in the accompanying drawings, wherein like reference characters refer to like elements throughout.

A receiving station is any station that is able to receive signals. In the text that follows, a mobile station is considered to be a receiving station. A mobile station is, for example, a mobile phone or also a device the location whereof can be moved, for the transmission of image and/or sound data, for sending faxes, for sending short messages via a Short Message Service (SMS), for sending emails and for Internet access. It is therefore a general transmitting and/or receiving unit in a radio communications system.

A transmitting station is understood to be a station that is able to transmit a signal provided with a code, i.e. a modulated signal. A transmitting station may be assigned to a radio communications system or be an external station that exchanges data with the radio communications system or is used by the radio communications system. In particular, a transmitting station is a satellite in a GPS system.

Signals that are provided with a code or modulated are both GPS signals and any other signals used in relation to a determination of distance or determination of position.

The invention can be used advantageously in any radio communications systems. Radio communications systems are understood to be any systems wherein a data transmission ensues between stations via a radio interface. The data transmission can ensue both bi-directionally and uni-directionally. Radio communications systems are in particular any mobile radio systems, for example those based on the GSM (Global System for Mobile Communication) or the UMTS (Universal Mobile Telecommunication System) Standard. Future mobile radio systems, for example fourth generation systems, are to be understood as being radio communications systems.

In the text that follows, the invention is described using as an example a mobile radio system based on the UMTS Standard, without however being restricted thereto.

FIG. 1 shows a diagram of a signal transmission by four satellites SAT1, SAT2, SAT3, SAT4 to a mobile station MS, which is located in a radio cell Z. A cell identifier ZID of the radio cell Z is assigned to the mobile station MS. Via the cell identifier ZID, a rough geographical position, based on the known geographical position of the radio cell Z, is assigned to the mobile station. The corresponding geographical position is typically the center of the radio cell Z, the position of a base station BS that supplies the radio cell Z, or even the weighted mean of a plurality of radio cells, if the mobile station MS is at the same time connected to a plurality of radio cells.

The four satellites SAT1, SAT2, SAT3, SAT4 transmit to the mobile station MS the signals S1, S2, S3, S4 respectively, which are modulated with a satellite-specific code C1, C2, C3, C4. The signals S1, S2, S3, S4 have a respective signal transfer time t1, t2, t3, t4 and are used to determine the distance between the mobile station MS and the corresponding satellite and to determine the position of the mobile station MS. Position data for the satellites SAT1, SAT2, SAT3, SAT4 is known to the mobile station MS. The mobile station knows the orbits of the satellites SAT1, SAT2, SAT3, SAT4 from the corresponding Almanac AL and ephemeris information EP, which is transmitted thereto from a radio access network UTRAN by a base station BS. The mobile station MS evaluates the signals S1, S2, S3, S4 received by the satellites SAT1, SAT2, SAT3 and SAT4 and, for each signal S1, S2, S3, S4, it determines a phase offset of the respective code C1, C2, C3, C4 received with respect to the respective reference codes produced in the mobile station MS. The reference codes concur with the codes C1, C2, C3, C4 for the respective satellites SAT1, SAT2, SAT3, SAT4 and are produced by the mobile station MS in such as way that, if the mobile station MS and the satellites SAT1, SAT2, SAT3, SAT4 were to be in perfect synchronization, there would be no phase shift if the corresponding satellite SAT1, SAT2, SAT3, SAT4 and the mobile station MS were to be located in the same place. The phase offset that is actually measured is obtained from the transfer time t1, t2, t3, t4 of the corresponding signal S1, S2, S3, S4 of the satellites SAT1, SAT2, SAT3, SAT4 and from an imperfect synchronization of the atomic clocks on satellites SAT1, SAT2, SAT3, SAT4 with one another and with a clock on the mobile station MS, which achieves time measurement for the mobile station MS.

Signals S1, S2, S3, S4 of the satellites SAT1, SAT2, SAT3, SAT4 contain respective so-called ephemeris information, which records inter alia a deviation of the respective satellite SAT1, SAT2, SAT3, SAT4 from its stable orbit and contains information on the error in the clocks on satellites SAT1, SAT2, SAT3, SAT4. The mobile station MS transmits information I to the base station BS of the radio access network UTRAN, which information contains in particular the phase shifts measured for codes C1, C2, C3, C4. The current ephemeris information is known in the radio access network via a control GPS receiver, for example. Of course, the information I can also contain current ephemeris information for satellites SAT1, SAT2, SAT3, SAT4, should the data not exist in the UTRAN radio access network.

The base station BS is connected to a radio network controller RNC, wherein a calculating unit BE is located. In the calculating unit BE, an iterative method of determining the distance between the mobile station MS and the satellites is carried out. From the satellite distances, the position of the mobile station MS is further determined. The method uses the Almanac information and the ephemeris information from satellites SAT1, SAT2, SAT3, SAT4 and also the phase shifts of the codes C1, C2, C3, C4 from the satellites SAT1, SAT2, SAT3, SAT4, the shifts having been measured by the mobile station MS. The radio network controller RNC, which is connected to a core network CN of the radio communications system, is able to pass on to the core network CN the position determined by the calculating unit BE. From the core network CN, the position can then be transmitted to any further communications systems.

Of course, the calculating unit BE can also be arranged in the mobile station MS or in the core network CN.

Figure 2:
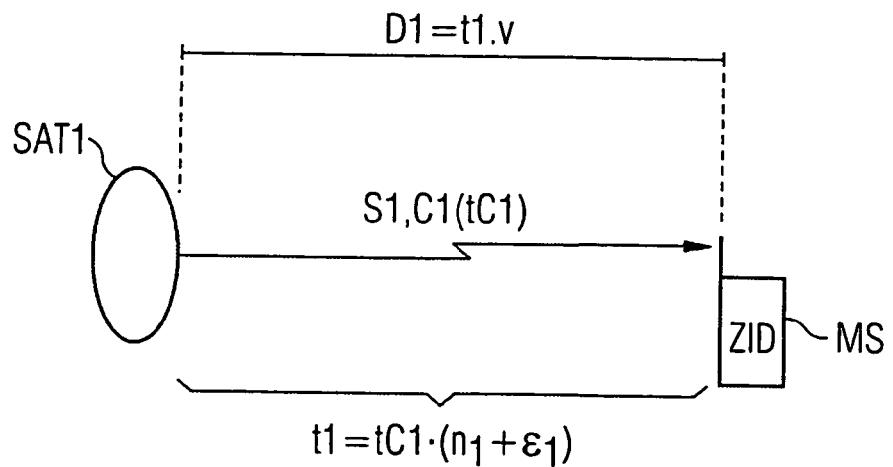

FIG. 2 shows a diagram of the transmission of a signal S1 from a satellite SAT1 to a mobile station MS. The signal S1 is modulated with a code C1, which has a duration of tC1 seconds and which is repeated accordingly every tC1 seconds. The duration tC1 of the code C1 is distinctly shorter than the total time t1 that the signal S1 requires to be transmitted over the distance D1 between the satellite SAT1 and the mobile station MS.

The signal transfer time t1 can be expressed by the duration tC1 of a code cycle. Hence $$t1 = tC1 * (n_1 + \epsilon_1).$$

In the above formula, $n_1$ is a whole number $\geq 0$ and corresponds to the number of integral multiples of the code C1 produced during the signal transfer time t1. The irrational number $\epsilon_1$ is between 0 and 1 and corresponds to fragments of a code C1.

For the distance D1 between the satellite SAT1 and the mobile station MS, the following formula applies:

$$D1 = t1 * v,$$

v being the propagation velocity of the signal S1.

The phase offset between the code C1 received and the reference code produced in the mobile station MS is the irrational number $\epsilon_1$. It is determined directly by the mobile station MS. The integral multiples $n_1$ of the code C1 and also the clock error on the satellite SAT1, and the clock error on the mobile station MS are determined by the iterative method in the calculating unit BE.

The invention has the advantage that the first iteration only is used to determine the integral multiples $n_1$. Thus a saving is achieved compared to existing methods, with respect to the calculations and computing power required. By a cell identifier ZID of the radio cell Z in the mobile station MS, the geographical position of the mobile station MS is known with greater accuracy than is the half-wavelength $\Lambda$ of the code C1 prior to the determination of position using GPS. Here, the wavelength $\Lambda$ of the code C1 is equal to the product of the propagation velocity v of the signal S1 and the duration tC1 of the code C1. Where the duration tC1 of the code C1 is for example one millisecond, the half-wavelength $\Lambda$ of the code C1 is about 150 km. Since typical cell sizes in mobile radio systems are in the order of size of 20 km, a knowledge of the cell identifier ZID means that the position of the mobile station MS can already be determined more readily than the half-wavelength $\Lambda$ even at the beginning of the determination of position. The number of integral multiples $n_1$ of the code C1 can therefore be calculated correctly in the very first iteration according to the invention. A fresh calculation of the number of integral multiples $n_1$ is no longer necessary in the following iterations.

Individual calculations of the method are described below with reference to FIG. 1 and FIG. 2:

A system of coordinates for calculating the position is, for example, selected in such a way that the origin of the system of coordinates is in the center of the earth. Such a system of coordinates is known in English as Earth-centered-Earth-fixed (ECEF). In the above exemplary embodiment, the codes C1, C2, C3, C4 that are used all have a duration tC1 of one millisecond and each consists of 1023 chips. The invention is not of course restricted thereto but can also be applied forthwith to other durations of the code sequences C1, C2, C3, C4 and accordingly to different numbers of chips. The invention can likewise be used where the codes C1, C2, C3, C4 do not all have the same duration or the same number of chips.

The phase offset between the codes C1, C2, C3, C4 received and the respective reference codes produced in the mobile station MS is determined by the mobile station MS and expressed in the form of whole chips $X_{w,i}$ and fragments $X_{f,i}$ of chips received. For further use in the method, the calculating unit BE converts the phase offset into a distance equivalent $C_i$.

$$C_i = \Lambda(X_{w,i} + 2^{-10} X_{f,i})/1023$$

The subscript i stands for the respective satellite SAT1, SAT2, SAT3, SAT4 and $\Lambda$ stands for the wavelength of the respective codes C1, C2, C3, C4 which, in the above exemplary embodiment, is the same for all the codes C1, C2, C3, C4.

The method for determining the distance now calculates the position of the respective satellite SAT1, SAT2, SAT3, SAT4 at the time of transmission of the corresponding signal S1, S2, S3, S4. Only the respective time of reception is known, however, with the result that in the first iteration of the method, an estimation of the time of transmission is then made for the respective signal S1, S2, S3, S4. As a starting value for the iterations, a time of transmission $t_s$ is selected, the time being for example $t_i^0 = 67.48$ milliseconds prior to the time of reception $t_e \cdot t_s^0 = t_e - t_i^0$ applies. Here the superscript stands for the number of iterations, beginning with zero in the first iteration. The above value is given by the fact that the satellites SAT1, SAT2, SAT3, SAT4 are at a distance of at least 20,230 km away when in a vertical position above the mobile station MS located on the earth's surface. In conjunction with the propagation velocity v of the signals S1, S2, S3, S4, a minimum signal transfer time of 67.48 milliseconds can thus be calculated and be preset as a starting value for the method in the very first iteration. Using the value for the time of transmission that has been estimated in this way, a first estimated position of the respective satellite $S_i^0$ is calculated.

Of course, starting values other than $t_i^0 = 67.48$ milliseconds can also be selected. However, any corresponding starting value $t_i^0$ is always based on a realistic assumption relating to the minimum distance between satellites SAT1, SAT2, SAT3, SAT4 and the mobile station MS. Consequently, different starting values $t_i^0$ can also be selected for the different satellites SAT1, SAT2, SAT3, SAT4.

Furthermore, to determine the distance, the method requires the error $\Delta t_i^k$ of the respective satellite clock. The superscript k is the iteration index and begins with k=0 in the first iteration. The method is able to calculate the satellite clock error $\Delta t_i^k$ with the aid of a clock correction vector $a_i$, which is contained in the ephemeris information.

$$\Delta t_i^k = a_0^i + a_1^i(t_e - t_i^k - t_{oe}^i) + a_2^i(t - t_i^k t_{oe}^i)^2$$

$a_0^i$, $a_1^i$ and $a_2^i$ are the components of the clock correction vector $a_i$ and $t_{oe}^i$ is the reference time for the ephemeris information.

The method uses the error $\Delta t_i^k$ to correct the distance equivalent C1 of the phase shift.

$$_i^k = C_i + c \Delta t_i^k$$

In a subsequent calculation of the method, the integral multiples $n_i$ of the codes C1, C2, C3, C4, produced during the transfer time t of the respective signal S1, S2, S3, S4, are calculated. To do this, the method uses a rough estimation of the position of the mobile station MS. It uses the cell identifier ZID of the radio cell Z, the identifier being assigned to the mobile station MS, in order to estimate accordingly the geographical position $R^0$ of the mobile station MS. Assuming that the above position is more accurate than the half-wavelength $\Lambda$ of the codes C1, C2, C3, C4, in other words more accurate in the above exemplary embodiment than about 150 km, the exact value of the integral variables $n_i$ in the first iteration, i.e. for k=0, is:

$$n_i = \text{int}\{(\|R^0 - S_i^0\| - {}_i^0)/\Lambda\}$$

int(x) being the next whole number to the number x, with int(x)$\leq$x.

In subsequent iterations, i.e. for k>0, $n_i$ is not re-calculated.

The clock error on the mobile station MS is the same for all the satellites SAT1, SAT2, SAT3, SAT4 and is therefore calculated using data from one satellite only. The following formula generally applies:

$$t_b^k = {}_i^k + n_i \Lambda - \|R^0 - S_i^0\|$$

Using the integral variables $n_i$ of the codes C1, C2, C3, C4, the distance equivalent ${}_i^k$, of the phase offset and the clock error $t_b^k$ of the mobile station MS, corrected by the satellite clock error $\Delta t_b^k$, a distance $\rho_i^k$ from the mobile station MS, known as the pseudo range, is calculated for each satellite SAT1, SAT2, SAT3, SAT4.

$$\rho_i^k = {}_i^k + n_i \Lambda + c\, t_b^k$$

Using as a basis the distances $\rho_i^k$ of the satellites SAT1, SAT2, SAT3, SAT4, a new estimated value $R^{k+1}$ is determined for the position of the mobile station MS. By the new estimated value and of the position $S_i^k$ of the respective satellite that has been estimated for the above iteration, a new estimated value for the signal transfer time $t_i^{k+1}$ is calculated between the respective satellite SAT1, SAT2, SAT3, SAT4 and the mobile station MS and used in the following iteration. The following formula applies:

$$t_i^{k+1} = \|R^{k+1} - S_i^k\|/c$$

The method is considered to be converged if the following condition has been met:

$$\|R^{k+1} - R^k\| \delta$$

In the above case no further iteration is carried out. The distances $\rho_i^k$ between the mobile station and the satellites are fixed and the current estimated position $R^{k+1}$ is established as an actual position and converted into an output format that gives the geographical latitude, longitude, and altitude of the mobile station MS. The uncertainty of the position is at $\Delta u = \|R^{k+1} - R^k\|$.

If the condition $\|R^{k+1} - R^k\| > \Lambda/2$ is met, however, then the method interrupts any further calculations and issues an error report.

The invention has been described in detail with particular reference to preferred embodiments thereof and examples, but it will be understood that variations and modifications can be effected within the spirit and scope of the invention.

What is claimed is:

1. A method for iterative determination of a distance between a receiving station and a transmitting station, comprising:

receiving information by a calculating unit concerning a signal from the transmitting station that is received by the receiving station, the signal including a code which is received by the receiving station an integral number of times during a signal transfer time required for the signal to travel between the transmitting station and the receiving station;

calculating, during a first iteration, the integral number of times the code is received; and using the integral number in at least a second iteration without recalculating.

2. A method according to claim 1, wherein the integral number calculated in the first iteration is used in all iterations.

3. A method according to claim 2, wherein said calculating uses an estimation of a position of the receiving station to calculate the integral number.

4. A method according to claim 3, wherein the receiving station is located in a radio cell of a radio communications system, and further comprising basing the estimation of the position of the receiving station on a cell identifier of the radio cell, the cell identifier being assigned to the receiving station.

5. A method according to claim 4, wherein a value other than zero is used in the first iteration for the signal transfer time.

6. A device for iterative determination of a distance between a receiving station and a transmitting station, comprising:

an interface receiving information concerning a signal from the transmitting station that is received by the receiving station, the signal including a code which is received by the receiving station an integral number of times during a signal transfer time required for the signal to travel between the transmitting station and the receiving station; and a calculation unit calculating, during a first iteration, the integral number of times the code is received and using the integral number at least in a second iteration without recalculating.

7. A computer software product embodied on at least one computer-readable medium storing instructions to control a processor to perform a method comprising:

receiving information by a calculating unit concerning a signal from the transmitting station that is received by the receiving station, the signal including a code which is received by the receiving station an integral number of times during a signal transfer time required for the signal to travel between the transmitting station and the receiving station;

calculating, during a first iteration, the integral number of times the code is received; and using the integral number in at least a second iteration without recalculating.

8. A computer software product according to claim 7, wherein the integral number calculated in the first iteration is used in all iterations.

9. A computer software product according to claim 8, wherein said calculating uses an estimation of a position of the receiving station to calculate the integral number.

10. A computer software product according to claim 9, wherein the receiving station is located in a radio cell of a radio communications system, and further comprising basing the estimation of the position of the receiving station on a cell identifier of the radio cell, the cell identifier being assigned to the receiving station.

11. A computer software product according to claim 10, wherein a value other than zero is used in the first iteration for the signal transfer time.

12. A method according to claim 1, wherein a value other than zero is used in the first iteration for the signal transfer time.

13. A method according to claim 2, wherein a value other than zero is used in the first iteration for the signal transfer time.

14. A method according to claim 3, wherein a value other than zero is used in the first iteration for the signal transfer time.

15. A method according to claim 1, wherein said calculating uses an estimation of a position of the receiving station to calculate the integral number.

16. A method according to claim 15, wherein the receiving station is located in a radio cell of a radio communications system, and further comprising basing the estimation of the position of the receiving station on a cell identifier of the radio cell, the cell identifier being assigned to the receiving station.

17. A method according to claim 15, wherein a value other than zero is used in the first iteration for the signal transfer time.

* * * * *